United States Patent [19]

Curtin

[11] 4,103,943
[45] Aug. 1, 1978

[54] PIPE COUPLING

[76] Inventor: Hoyt S. Curtin, 3706 Capstan Cir., Westlake, Calif. 91361

[21] Appl. No.: 738,753

[22] Filed: Nov. 4, 1976

Related U.S. Application Data

[63] Continuation-in-part of Ser. No. 695,462, Jun. 14, 1976, which is a continuation-in-part of Ser. No. 537,093, Dec. 30, 1974, Pat. No. 3,971,574, which is a continuation-in-part of Ser. No. 329,727, Feb. 5, 1973, Pat. No. 3,857,588.

[51] Int. Cl.² .................. F16L 13/10; F16L 47/00
[52] U.S. Cl. .................................... 285/419; 285/423; 285/DIG. 16
[58] Field of Search .............. 285/419, 373, DIG. 16, 285/421, 423

[56] References Cited

U.S. PATENT DOCUMENTS

| 1,888,241 | 11/1932 | Rah .................. 285/373 X |
| 3,124,874 | 3/1964 | Woolley ............ 285/DIG. 16 |
| 3,352,575 | 11/1967 | Daspit ............... 285/373 X |
| 3,771,820 | 11/1973 | Hoss, Sr. et al. ...... 285/373 |
| 3,857,588 | 12/1974 | Curtin ............... 285/31 |
| 3,865,410 | 2/1975 | Chen ................. 285/31 |
| 3,980,325 | 9/1976 | Robertson ............ 285/249 |

FOREIGN PATENT DOCUMENTS

| 1,449,044 | 7/1966 | France ................ 285/419 |
| 693,408 | 8/1930 | France ................ 285/373 |
| 2,037,950 | 2/1972 | Fed. Rep. of Germany ... 285/DIG. 16 |

Primary Examiner—Thomas F. Callaghan
Attorney, Agent, or Firm—Lindenberg, Freilich, Hornbaker, Wasserman, Rosen & Fernandez

[57] ABSTRACT

A coupling for unthreaded pipes of a sprinkler system, which permits the replacement of a small damaged pipe section without bending the pipes already emplaced in the ground. The coupling is comprised of a pair of semi-cylindrical pipe sections adapted to fit around and engage the emplaced pipes. The longitudinal edges of the two semi-cylindrical pipe sections are formed so as to mate with one another to hold the sections together as an applied adhesive forms a water-tight seal. Two identical end collars slide along the emplaced pipes and grip the semi-cylindrical pipe sections, holding them in place during the bonding process.

5 Claims, 19 Drawing Figures

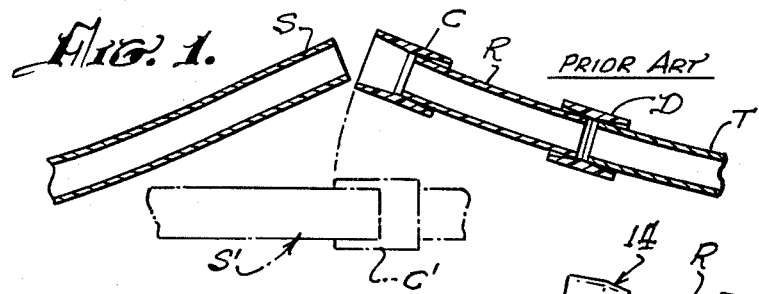
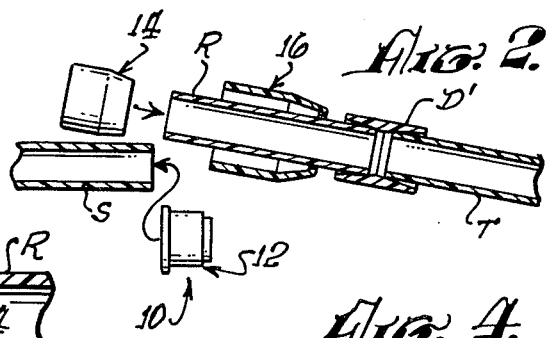
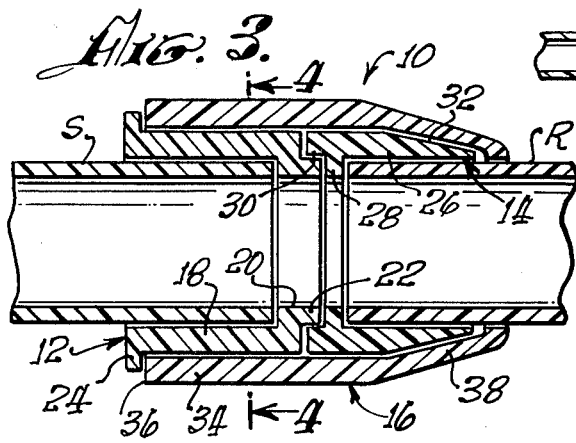
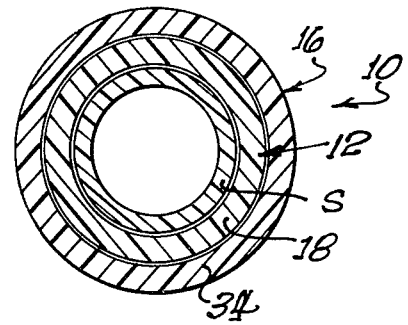
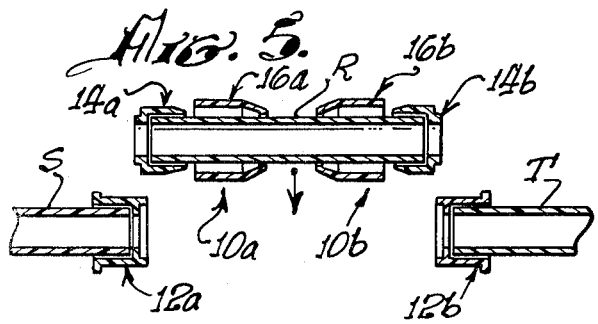
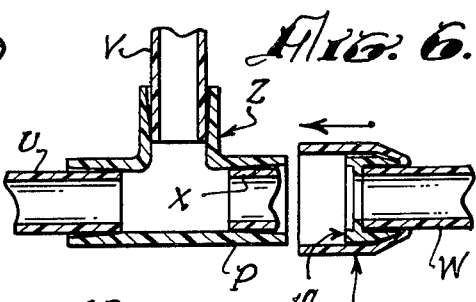
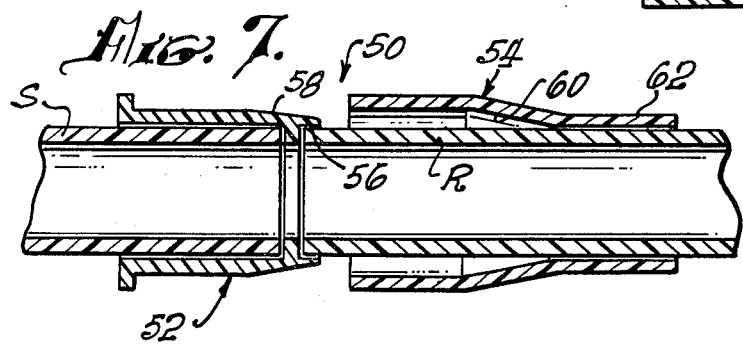

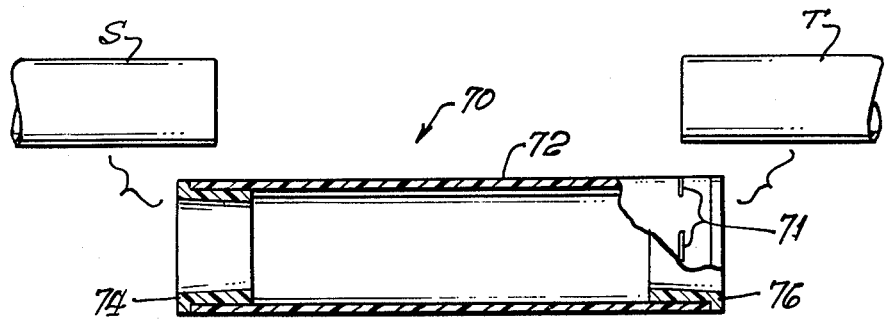
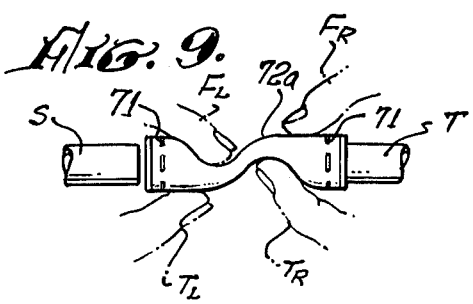
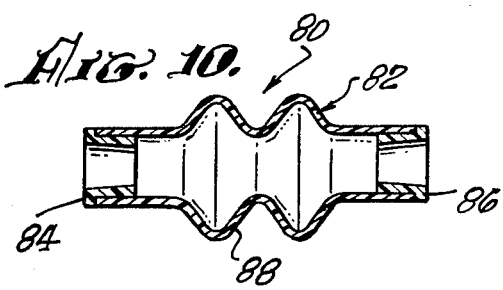
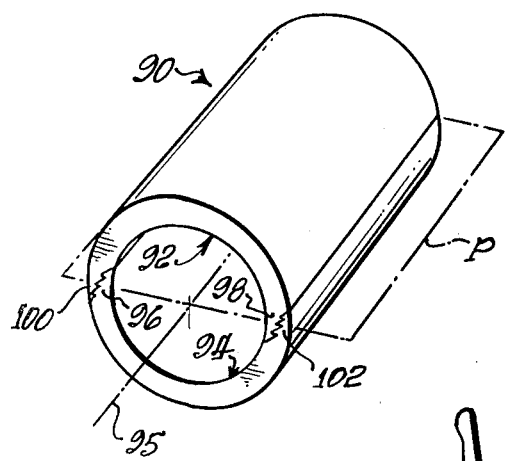
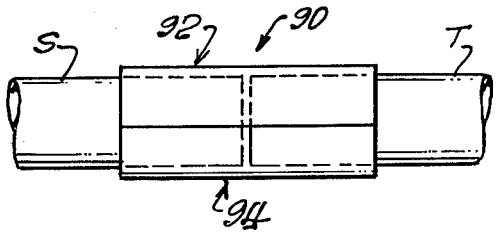
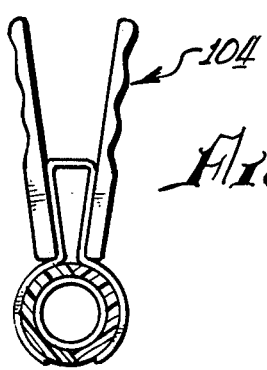

PIPE COUPLING

RELATED APPLICATIONS

This application is a continuation-in-part of U.S. patent application Ser. No. 695,462, filed June 14, 1976, which in turn is a continuation-in-part of U.S. patent application Ser. No. 537,093, filed Dec. 30, 1974 now U.S. Pat. No. 3,971,574, which is in turn a continuation-in-part of U.S. patent application Ser. No. 329,727, filed Feb. 5, 1973 now U.S. Pat. No. 3,857,588.

BACKGROUND OF THE INVENTION

This invention relates to pipe couplings, and more particularly to pipe couplings that are usable with unthreaded pipes.

Plastic pipes have become widely used in sprinkler systems because of their low cost and ease of connection and repair. Such pipes, commonly referred to as PVC pipes because of their typical polyvinyl chloride composition, may be joined without threading by applying an adhesive such as a solvent cement type to the ends of the pipes and slipping a smooth-bore coupling over the ends.

When a break occurs in an underground sprinkler system of the PVC type, it can be repaired by digging away the dirt over the break, cutting out a small section of pipe containing the break, and connecting a new section of pipe in place using a pair of couplings. In practice, however, great difficulty is encountered in installing the couplings. The couplings can be installed by bending the pipe in the ground far enough so that the gap between them is increased sufficiently to insert the pipes into the couplings, and then releasing the bent pipes so they return to their original straight configuration. However, the dirt around a long section of the pipes may have to be removed to permit sufficient bending, which involves considerable labor and which may not be possible in certain locations. Also, the glue on the pipe may be scraped away while the pipe is fitted into the coupling. A coupling which could be installed without requiring large amounts of pipe bending would facilitate repairs in such sprinkler systems.

SUMMARY OF THE INVENTION

In accordance with one embodiment of the present invention, a pipe coupling is provided for use with unthreaded pipes, which provides a reliable connection without requiring bending of pipes that are fixed in position in the ground.

The coupling is formed from two demi-cylindrical pipe sections that can be brought together so as to engage and envelope the ends of pipes to be coupled. The semi-cylindrical pipe sections have mating longitudinal edges which hold the pipe sections in place while the cement applied thereto is drying to form a water-tight seal.

In a preferred embodiment of the invention, the two semi-cylindrical pipe sections are identical and have sawtooth surfaces formed along their mating longitudinal edges. A notch is formed at each end of one edge, while at each end of the other edge, a lug is formed. When the semi-cylindrical pipe sections are joined, the lugs on one section mate with the notches on the other section and vice-versa. The interlocking lugs and notches thus provide surfaces upon which the applied adhesive can create a water-tight seal preventing leakage longitudinally along the pipe surface.

In still another embodiment of the invention, the coupling forms a "T" joint for the connection of three pipes. Here one of the semi-cylindrical pipe sections has an opening that projects perpendicular to the centerline of the two semi-cylindrical sections and is capable of accepting an unthreaded pipe to be solvent-cemented to the coupling.

In still another embodiment of the invention, a coupling is comprised of two identical semi-cylindrical sections held together by two identical end collars sliding along the emplaced pipes and gripping the two semi-cylindrical sections surrounding the unthreaded pipes sought to be joined.

In still another embodiment of the invention, the end collars have ribbed external surfaces for gripping and twisting in place during final assembly.

In a preferred embodiment of the invention, the two end collars have beveled internal surfaces that mate with the external surfaces of the ends of the two semi-cylindrical sections being held together.

The novel features of the invention are set forth with particularity in the appended claims. The invention will best be understood from the following description when read in conjunction with the accompanying drawings.

BRIEF DESCRIPTION OF THE DRAWINGS

FIG. 1 is a sectional side view of a pipe and coupling of the prior art, showing how the coupling was installed in the prior art;

FIG. 2 is a sectional side view of a pipe coupling constructed in accordance with one embodiment of the present invention, showing the manner of installation in a pipe system;

FIG. 3 is a sectional side view of the coupling of FIG. 2, showing it completely installed in the pipe system;

FIG. 4 is a view taken on the line 4—4 of FIG. 3;

FIG. 5 is a sectional side view of an assembly constructed in accordance with the coupling of FIG. 3, but showing installation in a situation where substantially no bending of the emplaced pipes is possible;

FIG. 6 is a sectional side view of a portion of the coupling of FIG. 3, showing its employment in connection with a T-connector that has a broken pipe end lodged therein;

FIG. 7 is a sectional view of a pipe coupling constructed in accordance with another embodiment of the invention;

FIG. 8 is a sectional side view of a coupling constructed in accordance with still another embodiment of the invention;

FIG. 9 is a side elevation view of the coupling of FIG. 8, showing the manner in which it is installed on a pipe line;

FIG. 10 is a sectional side view of a coupling constructed in accordance with yet another embodiment of the invention;

FIG. 11 is a perspective view of a coupling constructed in accordance with yet another embodiment of the invention;

FIG. 12 is a side elevation view of the coupling of FIG. 11, showing it installed in a pipe line;

FIG. 13 is a sectional end view of the coupling of FIG. 11, showing how a clamp is applied to hold it together while cement thereon is drying;

DESCRIPTION OF THE PREFERRED EMBODIMENTS

Figure 14:
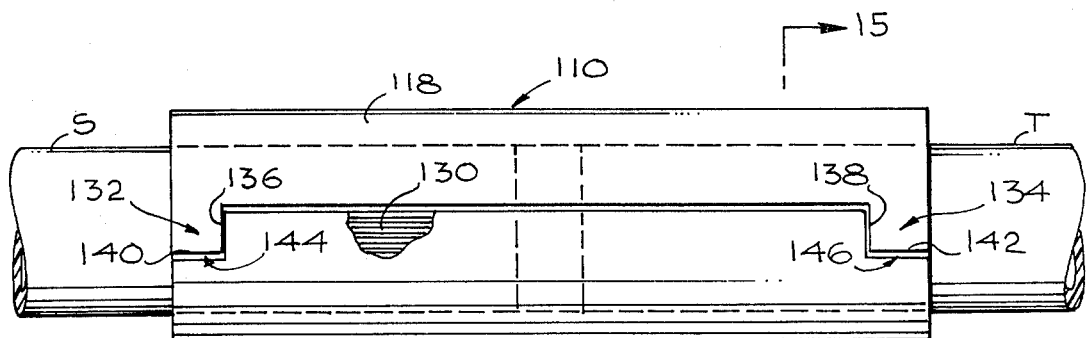
FIG. 14 is an elevation view of a coupling in accordance with yet another embodiment of the invention comprised of mating semi-cylindrical pipe sections.

FIGS. 1–16 hereof are identical to FIGS. 1–16 of U.S. patent application Ser. No. 695,462, filed June 14, 1976.

FIG 1 illustrates a pair of couplings C and D of the prior art, showing how they are used to connect a replacement pipe section R to the ends of a pair of pipes S and T. This is accomplished by installing the coupling D to connect the two pipes R and T, and installing the other coupling C over an end of the pipe R, as shown. The mating surfaces of the couplings and pipes are made watertight by applying a suitable solvent cement thereto prior to insertion of the pipe ends into the couplings. Solvent cement is applied to the end of pipe S and to the interior of the free end of coupling C as illustrated in the figure. Considerable bending of the two pipes S and T is required to separate them sufficiently to permit insertion of the pipe S into the coupling C. Thereafter, the pipes are straightened to the positions at S' and C'. As a result of the bending and straightening, the pipes and couplings are somewhat distorted, thereby reducing the strength of the ultimate bond. In sprinkler systems wherein the pipes S and T were in the ground, considerable soil had to be removed to permit the required amount of bending.

FIG. 2 illustrates a coupling 10 which employs a forward end cap 12 that fits over the end of one pipe S, a rearward end cap 14 that fits over the end of another pipe R, and a sleeve 16 that can fit around the two end caps 12, 14 to securely hold them in alignment and therefore securely couple the pipes. The replacement pipe section R may be first connected to one pipe T with an ordinary coupling D, and the coupling assembly 10 of the present invention then may be used to connect the other end of the pipe R. Only a small amount of bending of one or both pipes S, T is required in order to install the first coupling D and to install the end caps and sleeve of the coupling assembly 10. The amount of bending required in the embodiment of FIG. 2 is much less than required in the prior art, so that very little, if any, additional soil must be removed around the pipes S, T to make a repair.

FIG. 3 illustrates details of the coupling assembly 10. The forward end cap 12 has a pipe portion 18 with an inside diameter slightly greater than the diameter of the pipe S, to fit snugly around the end of the pipe. The cap 12 also has an inwardly extending flange 20 that abuts the end of the pipe S to determine the position of the cap on the pipe, and a short tubular portion 22 that extends rearwardly beyond the pipe S and the flange 20. The cap 12 further has an outwardly extending flange 24 at its forward end. The rearward cap 14 also has a pipe portion 26 that closely surrounds the pipe R, an inwardly extending flange 28 at its forward end that abuts the end of the pipe R, and a short tubular portion 30 that extends forwardly beyond the pipe R and beyond the flange 28. The tubular portions 22, 30 of the two end caps are constructed to closely interfit, the tubular portion 22 of the forward cap being closely received in the tubular portion 30 of the rearward cap for alignment. It also may be noted that the rearward portion of the rearward cap is tapered at 32 on its outside.

The sleeve 16 has a length approximately equal to the combined lengths of the two end caps 12, 14 and it is designed to closely fit over them. The sleeve has a pipe portion 34 along most of its length that is closely received around the two end caps, and with a forward end 36 that nearly abuts the flange 24 on the forward cap. The sleeve also has a rearward portion 38 that is tapered along its inside to closely fit the tapered rearward portion 32 of the rearward cap.

The coupling assembly 10 is installed by first applying adhesive, such as a solvent cement, to the inside surfaces of the sleeve 16, and then slipping the sleeve onto the pipe R as illustrated in FIG. 2. No glue touches pipe R at this time. Adhesive is then applied to the ends of the pipes S and R, and the two end caps 12, 14 are then installed on the ends of their respective pipes S, R. The adhesive is then applied on the outside of the two caps 12, 14, except on the outside of the forward flange 24 of the forward cap. The short tubular portion 22 of the forward cap is inserted into the short tubular portion 30 of the rearward cap, which is easily done because of the short length of these tubular portions (their overlap is on the order of 1/64th inch). The sleeve 16 is then slid over the two end caps to the position illustrated in FIG. 3. The sleeve 16 is slid forwardly as far as possible, and is normally stopped by engagement of the tapered portions 32, 38 of the rearward cap and sleeve. It should be noted that the fluing surfaces are aligned and undistorted prior to sliding the sleeve 16 over the caps 12, 14.

The coupling assembly 10 provides a reliable pipe connection, because all parts are held along a considerable tubular length. Thus, the pipe portions 18, 26 of the two end caps are joined to their respective pipes S, R along a considerable surface area while the sleeve 16 is joined to the two end caps along a considerable tubular area. Also, in order for water to leak out, it would have to pass along a considerable tubular area where adhesive holds the parts together. The interfitting short tubular portions 22, 30 also aid in sealing. It may be noted that the male tubular portion 22 may be formed on the rearward cap 14 and the female tubular portion formed on the forward cap 12, instead of vice versa, if desired.

FIG. 5 illustrates the manner in which two pipe couplings 10a and 10b of the present invention can be utilized in a situation where essentially no bending of the emplaced pipes S and T is possible. Instead of using one ordinary coupling D of the prior art as illustrated in FIG. 2, two couplings of the present invention are employed at the opposite ends of the replacement pipe R. The installation of FIG. 5 is made by installing two forward end caps 12a, 12b on the two pipes S and T.

Two sleeves 16a and 16b are installed on the pipe R and two rearward end caps 14a, 14b are installed on the ends of the pipe section R. The pipe section R is then dropped into alignment with the two pipes, S, T and the sleeves are then slid into position.

FIG. 6 illustrates how a portion of the coupling assembly of the invention can be utilized to connect a replacement pipe W to a T-coupling (or L-coupling) Z of the prior art. The coupling Z is shown with a pipe end X broken off inside. The installation is made by attaching a rearward end cap 14 to the replacement pipe W, moving the forward end of the cap 14 against the T-coupling Z, and then sliding the sleeve 16 over the rear cap 14 and an end P of the coupling Z. The coupling end P is of the same outside diameter as the rearward cap 14, so that the coupling 16 is closely received thereon. Thus, the same coupling assembly can be utilized to connect to a T-coupling of the prior art, by eliminating the forward end cap.

FIG. 7 illustrates a coupling assembly 50 constructed in accordance with another embodiment of the invention, which utilizes only one end cap 52 and a sleeve 54. The cap 52 is similar to the forward end cap of the assembly 10, except that it has a female tubular portion 56 at its rearward end for directly receiving the end of the pipe R. Also, the cap 52 is tapered along the outside of its rearward portion 58. The sleeve 54 is similar to the sleeve of the coupling assembly 10, except that the taper at 60 occurs along a middle portion, and the rearward portion 62 is formed to closely receive the pipe R. The installation of the coupling assembly 50 is accomplished by applying adhesive to the inner surface of sleeve 54 and sliding the sleeve 54 over the pipe R. Adhesive is then applied around the ends of the pipe S. The end cap 52 is then installed on the end of the pipe S and with its tubular portion 56 receiving the end of the pipe R. Adhesive is then applied to the outside of cap 52 and pipe R, and the sleeve 54 is then slid forwardly over the cap 52.

FIGS. 8 and 9 illustrate a coupling 70 constructed in accordance with a further embodiment of the invention, which utilizes a highly flexible sleeve 72 and a pair of substantially rigid inserts 74, 76 at the ends of the sleeves. The sleeve 72 has sufficient flexibility so that it can be readily deformed by a person to the configuration illustrated in FIG. 9, to thereby shorten the length between the ends of the coupling. A variety of material such as vinyl with considerable plasticizer can be utilized to achieve much flexibility. The sleeve 72 cannot be readily used along because solvent cement, which is the most common type utilized in PVC sprinkler pipe repair, requires considerable time to bond to suitable highly-flexible material. While the common more rigid PVC pipes can be bonded together with solvent cement in a time less than about 20 minutes, bonding of such rigid PVC to the highly flexible vinyl can require hours. The inserts 74, 76 minimize the bonding time, inasmuch as the inserts are constructed of ordinary rigid PVC. Also, the inserts are internally tapered to facilitate joining to another pipe. The inserts 74, 76 minimize the bonding time, inasmuch as the inserts are constructed of ordinary rigid PVC. Also, the inserts are internally tapered to facilitate joining to another pipe. The inserts 74, 76 are installed, as with solvent cement, at the factory so that the longer bonding time is not a highly significant factor. A repairman installs the coupling 70 to replace a damaged pipe section, by cutting out the damaged section to leave two pipe ends S and T. The coupling 70 is provided with markings 71 near either end thereof to serve as a gauge that indicates the required gap length. The repairman coats the ends of the pipes S and T and the insides of the inserts 74, 76 with solvent cement and then inserts one pipe T into one insert 76. He then deforms the sleeve 72 as to the configuration illustrated at 72a in FIG. 9 with his thumbs $T_R$ and $T_L$ and forefingers $F_R$ and $F_L$ to reduce the length of the coupling. The shortened coupling can then be inserted into the other pipe S and allowed to return to its cylindrical shape, so that it becomes longer while receiving the other pipe end S.

FIG. 10 illustrates a coupling 80 constructed in accordance with yet another embodiment of the invention wherein a flexible sleeve 82 is utilized in conjunction with end inserts 84, 86 of harder material, in which the flexible sleeve is formed with a bellows portion 88. The flexible sleeve and inserts are of material similar to those described in the coupling of FIGS. 8 and 9. The bellows portion 80 makes compression of the length of the sleeve even easier.

FIGS. 11–13 illustrate a still further embodiment of the invention, wherein the coupling 90 includes a pair of semi-cylindrical parts 92, 94 that can be fitted together over the ends of pipes S, T. The two parts 92, 94 are identical, and each extend slightly more than 180° and has serrated sides 96, 98 or 100, 102. Each part 92, 94 is substantially one of the halves of a pipe cut along an imaginary plane P that extends through the axis 95 of the pipe. The serrated sides of the two parts interfit and serve to hold the parts together while solvent cement dries thereon. Both parts may be constructed of an ordinary largely rigid vinyl that can be rapidly solvently cemented to PVC pipes. The coupling 90 is installed by applying solvent cement to the serrated sides 96-102 of the semi-cylindrical parts, as well as to the inside surfaces thereof and to the outside surfaces of the ends of the pipes S and T. The two coupling parts 92, 94 are then placed on opposite sides of the pipes and pressed together so that their serrated sides 96-102 interfit. The coupling parts can be even more securely held together by means of a clamp 104 illustrated in FIG. 13 which is removed after the solvent cement has at least partially dried.

Figure 15:
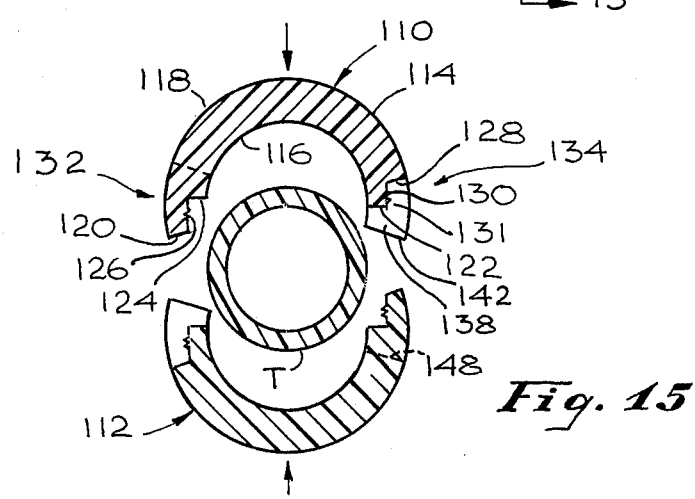
FIG. 15 is a sectional view taken substantially along plane 15—15 of FIG. 14 showing the semi-cylindrical pipe sections separated.

Attention is now called to FIGS. 14 and 15 which illustrate a further embodiment of the invention similar to that depicted in FIGS. 11-13 but differing therefrom in the shape of the opposing surfaces of the two semi-cylindrical parts. In the embodiment of FIGS. 14 AND 15, the two parts 110 and 112 are configured so as to automatically interlock relative to one another when they are squeezed around the emplaced pipes S and T to be repaired.

The semi-cylindrical pipe sections 110 and 112 are identical and each is formed by a wall 114 having inner and outer semi-cylindrical surfaces, 116 and 118, and first and second longitudinal edges 120 and 122. A shoulder 124 is formed proximate to the longitudinal edge 120 and extends between the inner surface 116 and an exposed surface 126. A shoulder 128 is formed proximate to the longitudinal edge 122 and extends between the outer surface 118 and an exposed surface 130. The exposed surfaces 126 and 130 extend substantially parallel to one another and preferably lie on a tangent to a concentric circular path about the common axis of the pipe sections. A series of serrations or teeth 131 are formed on the exposed surfaces 126 and 130.

The wall 114 of pipe section 110, as can best be seen in FIG. 14, is shaped to define lugs 132 and 134 adjacent each end of the pipe section edge 122. More particularly, the surface 130 of the pipe section 110 extends to and terminates at shoulders 136 and 138 which shoulders define the inner boundaries of the lugs. The lugs 132 and 134 respectively have terminal surfaces 140 and 142 extending parallel to the axis of the pipe sections and perpendicular to the shoulders 136 and 138 respectively. As can best be seen in FIG. 14, the surface 142 extends beyond the longitudinal edge 122.

Whereas projecting lugs 132 and 134 are formed adjacent the ends of exposed surface 130, notches 144 and 146 are formed in the pipe section adjacent the ends of exposed surface 125 along edge 120. Notch 145, for example, is defined by shoulder 147 adapted to abut lug shoulder 138 and surface 148 adapted to abut lug surface 142. It will be recognized of course that the peripheral arcuate path of each pipe section exceeds 180° so as to permit the exposed serrated surfaces of the pipe sections 110 and 112 to overlap.

In the use of the coupling of FIGS. 14 and 15, solvent cement is first applied to surfaces 120, 126, 124, 116, 122, 130 and 128 of both parts 110 and 112, as well as along the end portion of the exterior surfaces of the emplaced pipes S and T. Parts 110 and 112 are then placed around the emplaced pipes S and T, as depicted in FIG. 15, so that the lugs 132 and 134 of part 110 align with the notches of the mating part 112 while the notches of part 110 align with the lugs of part 112.

Finally, the parts 110 and 112 are squeezed together so that the teeth 131 of the mating surfaces 126 and 130 interlock and firmly hold parts 110 and 112 in place while the solvent cement cures. Because the surfaces 126 and 130 extend substantially parallel to one another and because multiple teeth are provided on these surfaces, the pipe sections 110 and 112 are able to accommodate slightly oversized emplaced pipes S and T while still properly interlocking. It should be noted that when interlocked, the lug surface 142 abuts the notch surface 148 along a plane displaced from the boundary plane between longitudinal edge 122 and shoulder 124. Thus, the adhesive applied to the interlocking surfaces of the lugs and notches forms a water-tight seal acting as a water block against longitudinal migration of water along the pipe between surfaces 120 and 128 and surfaces 122 and 124.

Figure 16:
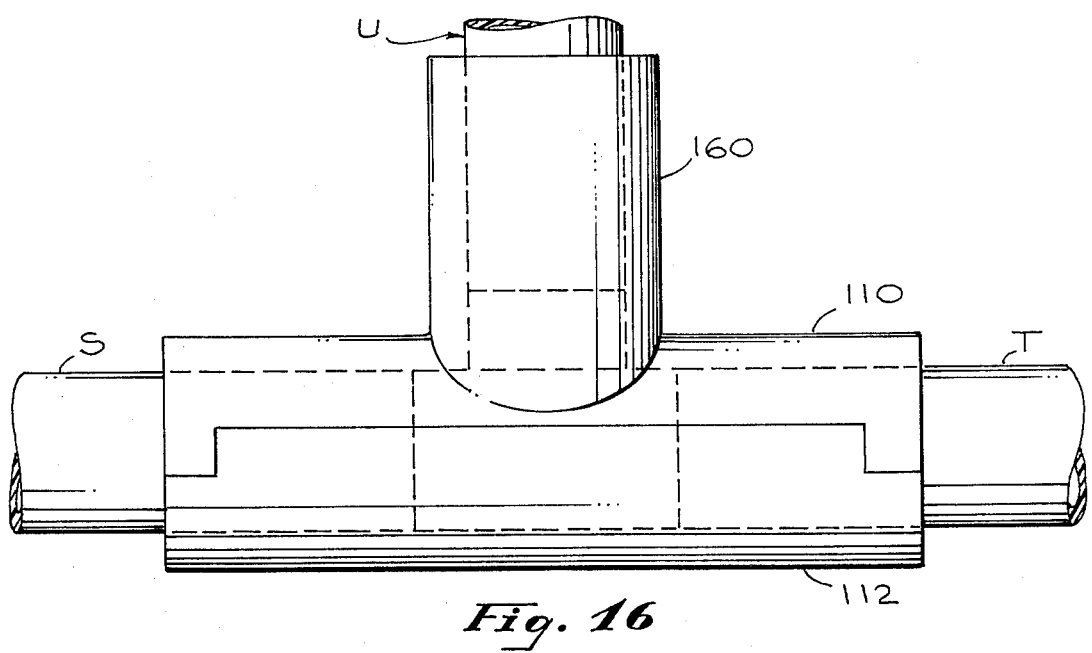
FIG. 16 is an elevation view of a coupling constructed in accordance with yet another embodiment of the invention showing a "T"-type connection joining three pipes.

FIG. 16 illustrates a further embodiment of the invention which is similar to that depicted in FIGS. 14 and 15 but differs therefrom in that part 110 has a female nipple 160 extending perpendicular to the centerline of pipes S and T. Nipple 160 can have a smooth inner wall for accepting unthreaded pipe U which is bonded in place with a suitable solvent-type cement or can be threaded to accept a threaded riser.

Figure 17:
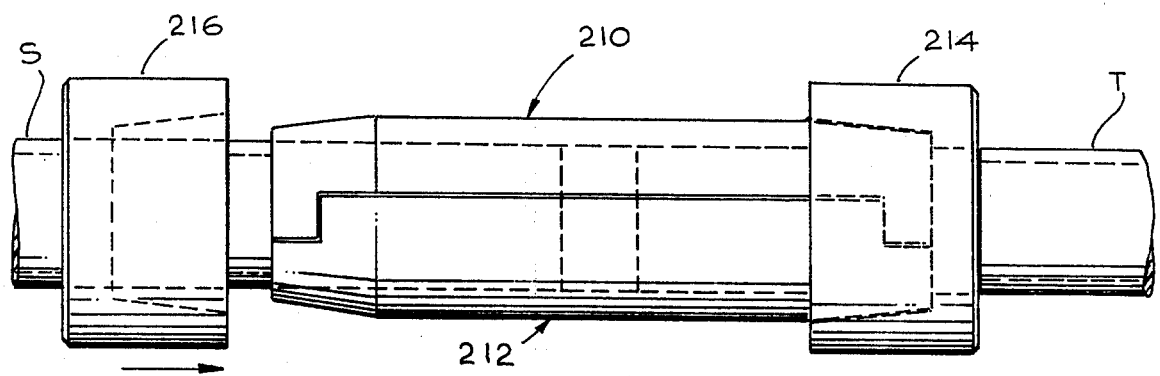
FIG. 17 is an elevation view of a coupling in accordance with yet another embodiment of the invention showing one end collar in place and one end collar prior to final assembly.
Figure 18:
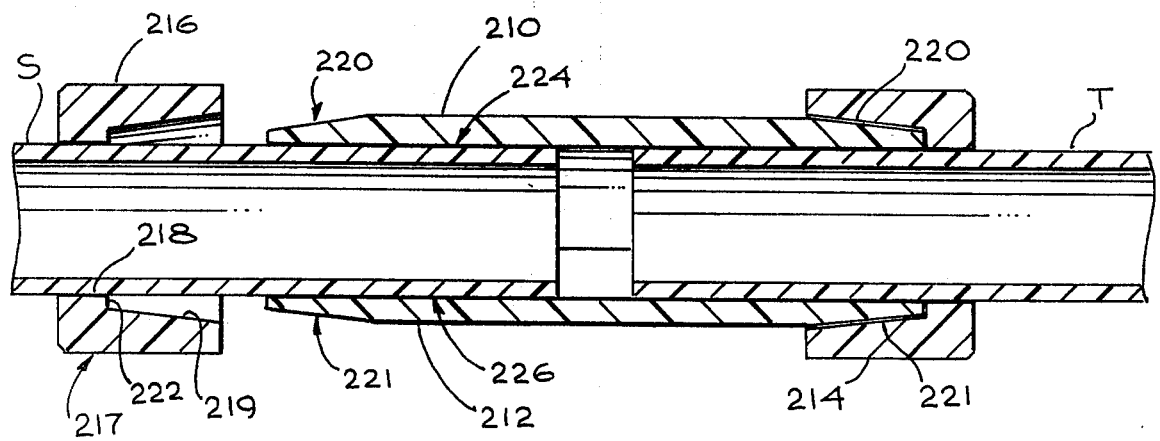
FIG. 18 is a sectional view of the coupling of FIG. 17.
Figure 19:
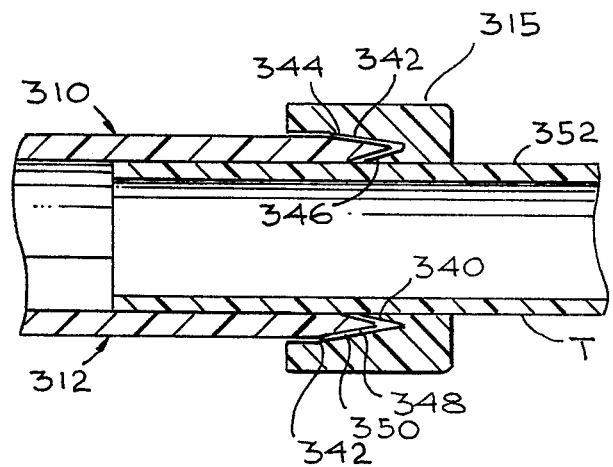
FIG 19 is a partial sectional view showing only one of two identical end collars in accordance with yet another embodiment of the invention in which the collars have an internal V-shaped groove to receive the two semi-cylindrical pipe sections.

FIGS. 17, 18 and 19 illustrate further embodiments of the invention which are similar to that depicted in FIGS. 14, 15 and 16, but differ therefrom in that a pair of end collars are utilized to bond to the ends of the semi-cylindrical pipe sections and to the pipe sections S and T. More particularly, the coupling of FIGS. 17 and 18 is comprised of semi-cylindrical pipe sections 210 and 212 which are identical to the previously-discussed pipe sections 110 and 112 of FIG. 14 except that their outer surfaces are tapered adjacent the ends thereof for receiving identical end collars 214 and 216.

More particularly, as depicted in FIG. 18, end collar 216 is formed by a tubular wall 217 having an inner surface comprised of first and second portions 218 and 219. Portion 218 is cylindrically shaped to conform to but be slightly greater than the outer surface of pipe S. Portion 219 is in the form of a right circular cone and conforms to the tapered surfaces 220 and 221 formed on the outer surface of pipe sections 210 and 212 adjacent their ends. Radial surface 222 is formed between the collar internal surface portions 218 and 219.

In use, prior to clamping pipe sections 210 and 212 together, end collars 214 and 216 are respectively placed on and slid along pipes S and T away from each other and away from the damaged pipe section. After the sections 210 and 212 are clamped together, solvent is applied to the tapered pipe section end surfaces 220 and 221 and to the adjacent portions of pipes S and T. Thereafter, end collars 214 and 216 are slid toward each other over pipe sections 210 and 212 so as to engage the inner surface portions 219 of end collars 214 and 216 against the tapered mating pipe section surfaces 220 and 221. This action of course forces the interlocking pipe sections 210 and 212 together thus clamping them securely and forming a water tight seal between the pipe sections 210 and 212 and between the end collars and both the pipes S and T. Additionally, the collar internal surface portion 218 adheres to the outer surface of pipe S and the radial surface 222 adheres to the end surfaces of pipe sections 210 and 212.

The outer surfaces of collars 214 and 216 are preferably ridged or knurled to facilitate gripping.

FIG. 19 depicts still another embodiment of the invention similar to that depicted in FIGS. 17 and 18, but differing therefrom in that the end collar 315 is provided with a thin flexible skirt 340 having a truncated right conical surface that intersects surface 342 which also forms a truncated right conical surface. These two intersecting surfaces 340, 342, form an internal circular V-shaped groove which receives the external, V-shaped ends of the semi-cylindrical pipe sections 310 and 312. Pipe section 310 has two truncated right conical surfaces 344 and 346 that mate with the surfaces 342 and 340, respectively, of end collar 315. Pipe section 312 also has two truncated right conical surfaces, 348 and 350, that mate with surfaces 342 and 340, respectively, of end collar 315.

In the use of the coupling of FIG. 19, solvent cement is applied and the pipe sections are brought together as more fully described with the embodiment depicted in FIGS. 14, 15 and 16. Solvent cement is then copiously applied to the surfaces 340, 342, 344, 346, 348, 350 and the external cylindrical surface 352 of pipe T. End collar 315 is then slid along pipe T and brought into close mating contact with pipe sections 310, 312. In so doing, the skirt 340 pushes solvent into the recess between the pipe T and pipe section surface 346. An identical final assembly process is performed at the opposite end of pipe sections 310 and 312 with an end collar identical to end collar 315.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A device for coupling first and second pipes having open ends spaced by less than a predetermined distance to form a water-tight seal therebetween, said device comprising:

first and second pipe sections each comprised of a substantially semi-cylindrically shaped wall having first and second longitudinal edges and an outer circumferential surface extending from said first edge to a first shoulder extending parallel to and spaced from said second edge, and an inner circumferential surface extending from said second edge to a second shoulder extending parallel to and spaced from said first edge, said wall being of substantially uniform thickness between said first and second shoulders and of reduced thickness between said first shoulder and said second edge and between said second shoulder and said first edge;

first and second end collars each comprised of a tubular wall having inner and outer surfaces, said collar inner surface including a first portion shaped to conform to, but dimensioned slightly greater than, the outer circumferential surface of one of said pipes so as to be adapted to slide along and be adhesively adhered thereto, and a second portion shaped to conform to and dimensioned slightly greater than the outer circumferential surface of said first and second pipe sections so as to be adapted to slide along and be adhesively adhered thereto to mate said first and second pipe sections to one another with the reduced thickness wall portions of each section overlapping the reduced thickness wall portions of the other section.

2. The device of claim 1 wherein each of said pipe sections further includes at least two longitudinally spaced lugs formed integral with said wall and extending circumferentially beyond one of the longitudinal edges thereof, and at least two notches formed in said wall extending circumferentially inwardly from the other longitudinal edge thereof; and wherein the lugs of each section are received in the notches of the other section when said pipe sections are mated.

3. The device of claim 1 including means formed on said semi-cylindrical pipe sections adjacent the longitudinal edges thereof for interlocking said pipe sections to one another around said first and second pipes.

4. The device of claim 1 wherein the outer surfaces of said semi-cylindrical sections are tapered adjacent their ends and wherein said collar inner surface second portion forms a right conical surface conforming to said taper.

5. The device of claim 1 wherein the ends of said semi-cylindrical sections are tapered along both their inner and outer surfaces and wherein said collar inner surface second portion is comprised of two intersecting right conical surfaces forming an internal V-shaped groove for receiving the ends of said semi-cylindrical sections.

* * * * *